United States Patent
Shibata et al.

(10) Patent No.: US 9,695,747 B2
(45) Date of Patent: Jul. 4, 2017

(54) VEHICLE ENGINE SPEED DISPLAY DEVICE

(71) Applicant: MAZDA MOTOR CORPORATION, Hiroshima (JP)

(72) Inventors: Tetsutaka Shibata, Hiroshima (JP); Kosuke Takegawa, Hatsukaichi (JP); Hiroyuki Watase, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 16 days.

(21) Appl. No.: 14/903,193

(22) PCT Filed: Jul. 9, 2014

(86) PCT No.: PCT/JP2014/068359
§ 371 (c)(1),
(2) Date: Jan. 6, 2016

(87) PCT Pub. No.: WO2015/005401
PCT Pub. Date: Jan. 15, 2015

(65) Prior Publication Data
US 2016/0138468 A1    May 19, 2016

(30) Foreign Application Priority Data
Jul. 12, 2013  (JP) ................. 2013-147036

(51) Int. Cl.
*F02B 77/08*     (2006.01)
*G01P 1/07*      (2006.01)
(Continued)

(52) U.S. Cl.
CPC ............... *F02B 77/08* (2013.01); *G01D 7/00* (2013.01); *G01P 1/07* (2013.01); *B60K 2350/352* (2013.01); *G01D 1/00* (2013.01)

(58) Field of Classification Search
CPC ............... B60W 10/10; B60W 10/11; B60W 2510/0638; B60W 2510/1005;
(Continued)

(56) References Cited

U.S. PATENT DOCUMENTS 5,928,106 A * 7/1999 Biros, Jr. ............ B60W 10/02
                                                    192/3.58
2005/0029023 A1    2/2005 Takami et al.
(Continued)

FOREIGN PATENT DOCUMENTS

JP    H01-154195 A    6/1989
JP    2005-39923 A    2/2005
(Continued)

OTHER PUBLICATIONS

International Search Report, PCT/JP2014/068359 mailed Oct. 7, 2014.

*Primary Examiner* — John Kwon
*Assistant Examiner* — Johnny H Hoang
(74) *Attorney, Agent, or Firm* — Studebaker & Brackett PC

(57) ABSTRACT

A vehicle engine speed display device is provided with an engine speed detection unit which detects an engine speed, an engine speed display unit which displays an engine speed, and a display control unit which controls the engine speed display unit on the basis of the detected engine speed. The display control unit determines whether a phase of a gear shift operation is an inertia phase when gear shift control of an automatic transmission is executed, and sets display responsiveness of a tachometer with respect to the detected engine speed higher than display responsiveness to be set when the phase is not the inertia phase, when the phase of the gear shift operation is determined to be the inertia phase.

20 Claims, 9 Drawing Sheets

(51) Int. Cl.
*G01D 7/00* (2006.01)
*G01D 1/00* (2006.01)

(58) Field of Classification Search
CPC .... F02B 77/08; F02D 45/00; F02D 2041/228; B60K 2350/352; G01D 1/00; G01D 1/07; G01D 7/00
USPC ...... 701/102, 110, 114, 115; 123/319, 339.1, 123/478–480
See application file for complete search history.

(56) References Cited

U.S. PATENT DOCUMENTS

| | | | | |
|---|---|---|---|---|
| 2006/0155447 A1* | 7/2006 | Uken | ................... | B60W 10/06 701/50 |
| 2007/0101972 A1* | 5/2007 | Majima | ............... | F02D 41/3836 123/458 |
| 2008/0091335 A1* | 4/2008 | Takemura | ............. | G01L 23/225 701/111 |
| 2008/0255750 A1* | 10/2008 | Yasui | ................... | F02D 41/008 701/103 |
| 2008/0262705 A1* | 10/2008 | Oe | ........................ | F02D 35/027 701/111 |
| 2008/0312808 A1* | 12/2008 | Mino | .................. | F02D 41/0045 701/104 |
| 2009/0064967 A1* | 3/2009 | Shikawa | ............. | F02D 13/0226 123/345 |
| 2011/0190991 A1 | 8/2011 | Araki et al. | | |
| 2012/0059567 A1* | 3/2012 | Seel | ....................... | F02D 11/105 701/102 |
| 2012/0073362 A1* | 3/2012 | Tanaya | .................. | G01M 15/02 73/114.62 |
| 2012/0192835 A1* | 8/2012 | Matsushima | ......... | F02D 35/027 123/436 |

FOREIGN PATENT DOCUMENTS

| | | |
|---|---|---|
| JP | 2006-242760 A | 9/2006 |
| JP | 2009-220678 A | 10/2009 |
| JP | 2011-158001 A | 8/2011 |

* cited by examiner

VEHICLE ENGINE SPEED DISPLAY DEVICE

TECHNICAL FIELD

The present invention relates to a vehicle engine speed display device and a control method for the vehicle engine speed display device, and more particularly, to a vehicle engine speed display device for displaying an engine speed of a vehicle including an automatic transmission, and a control method for the vehicle engine speed display device.

BACKGROUND ART

Conventionally, there has been used an engine speed display device for displaying an engine speed of a vehicle. The engine speed display device controls an engine speed display unit (a tachometer or a revolution counter) which displays an engine speed in accordance with an engine speed signal output from an engine speed sensor which detects the engine speed.

The engine speed signal varies while reflecting a subtle variation of the engine speed or a detection variation of the engine speed sensor. Therefore, causing the engine speed display unit to directly display a variation of the engine speed signal may result in continuous display of a subtle variation of the engine speed. This may lower the visibility.

In view of the above, in order to prevent lowering of the visibility, there is proposed a configuration, in which the display responsiveness of the engine speed display unit with respect to an engine speed signal output from the engine speed sensor is intentionally lowered.

For instance, Patent Literature 1 discloses a vehicle engine speed display device which determines the engine speed to be displayed on a display unit on the basis of engine speed signals to be output during a predetermined determination time period. The vehicle engine speed display device shortens the determination time period, as the engine speed increases. Specifically, the determination time period is extended when the engine is in a low speed condition. This makes it possible to lower the display responsiveness of the engine speed display unit with respect to an engine speed signal to thereby prevent a subtle variation of display. On the other hand, the determination time period is shortened when the engine is in a high speed condition. This makes it possible to enhance the display responsiveness of the engine speed display unit with respect to an engine speed signal. Thus, it is possible to carry out the display, while following a variation of the engine speed.

Further, Patent Literature 2 discloses an operation state display device of an internal combustion engine, in which an intended display operation is carried out in accordance with the driver's will by enhancing the display responsiveness of a tachometer when an accelerator pedal is operated by a predetermined amount or when a gear shift operation is performed in the manual gear shift mode.

A driver who drives a vehicle installed with a high-performance engine expects a sharp change in the engine speed at the time of a gear shift operation to make sure that the engine has high efficiency. At the time of a gear shift operation, the driver not only audibly perceives an engine speed change by the engine sound but also tries to visually perceive the change by a display change of the engine speed display unit.

However, the device disclosed in Patent Literature 1 is proposed to enhance the display responsiveness of the engine speed display unit, as the engine speed increases, and does not take into account whether it is the time of gear shift operation. Therefore, when the gear shift operation is performed when the engine in a low speed condition, the engine speed display unit may fail to fully display a sharp change in the engine speed.

Further, the device disclosed in Patent Literature 2 is proposed to enhance the display responsiveness of a tachometer throughout the whole period from the time when the gear shift operation is started by a gear shift command to the time when the gear shift operation is terminated. Therefore, the display responsiveness enhances not only in a period when the engine speed is changed by the gear shift operation but also in a period other than the above. This may make the engine speed change by the gear shift operation unclear.

As described above, in the conventional devices, it is difficult to control the engine speed display unit to display the engine speed in such a manner that a sharp change in the engine speed at the time of a gear shift operation is made clear.

CITATION LIST

Patent Literature

Patent Literature 1: Japanese Unexamined Patent Publication No. H1-154195
Patent Literature 2: Japanese Unexamined Patent Publication No. 2006-242760

SUMMARY OF INVENTION

In view of the aforementioned drawbacks of the conventional art, an object of the invention is to provide a vehicle engine speed display device that enables to control an engine speed display unit to display an engine speed in such a manner that a sharp change in the engine speed at the time of a gear shift operation is made clear, and a control method for the vehicle engine speed display device.

An aspect of the invention for accomplishing the aforementioned object relates to a vehicle engine speed display device installed in a vehicle provided with an engine, an automatic transmission coupled to the engine, and an automatic transmission control unit for controlling the automatic transmission. The display device includes an engine speed detection unit which detects an engine speed; an engine speed display unit which displays an engine speed; and a display control unit which controls display of the engine speed display unit on the basis of the engine speed detected by the engine speed detection unit. The display control unit includes a phase determination unit which determines whether a phase of a gear shift operation of the automatic transmission is an inertia phase when gear shift control of the automatic transmission is executed by the automatic transmission control unit, and a responsiveness changing unit which sets display responsiveness of the engine speed display unit with respect to the engine speed detected by the engine speed detection unit higher than display responsiveness to be set when the phase of the gear shift operation is not the inertia phase, when the phase of the gear shift operation is determined to be the inertia phase by the phase determination unit.

Another aspect of the invention relates to a control method for an engine speed display device installed in a vehicle provided with an engine, an automatic transmission coupled to the engine, and an automatic transmission control unit for controlling the automatic transmission. The control method includes a step of detecting an engine speed; and a step of controlling display of the engine speed display device on the basis of the detected engine speed. The step of controlling the display of the engine speed display device includes a step of determining whether a phase of a gear shift operation of the automatic transmission is an inertia phase when gear shift control of the automatic transmission is executed by the automatic transmission control unit; and a step of setting display responsiveness of the engine speed display device with respect to the detected engine speed higher than display responsiveness to be set when the phase of the gear shift operation is not the inertia phase, when the phase of the gear shift operation is determined to be the inertia phase.

According to the vehicle engine speed display device and a control method for the vehicle engine speed display device of the invention, it is possible to control an engine speed display unit to display an engine speed in such a manner that a sharp change in the engine speed at the time of a gear shift operation is made clear.

DESCRIPTION OF EMBODIMENTS

In the following, a vehicle engine speed display device, and a control method for the vehicle engine speed display device embodying the invention are described referring to the accompanying drawings.

First Embodiment

First of all, a mechanical configuration of a vehicle installed with an engine speed display device in the first embodiment of the invention is described.

Figure 1:
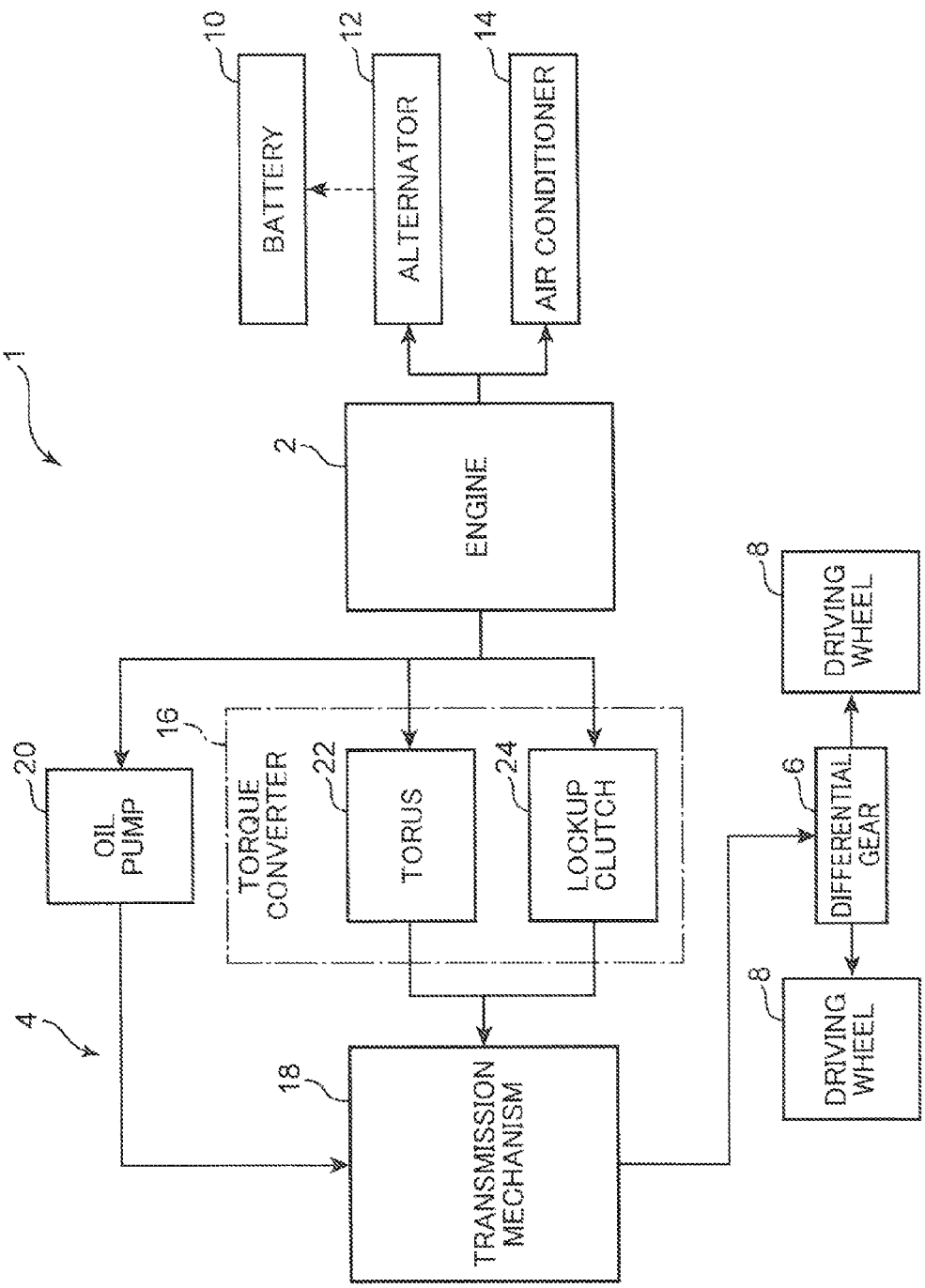
FIG. 1 is a block diagram illustrating a mechanical configuration of a vehicle installed with a vehicle engine speed display device in a first embodiment of the invention.

FIG. 1 is a block diagram illustrating a mechanical configuration of a vehicle installed with the engine speed display device in the first embodiment of the invention. A vehicle 1 illustrated in FIG. 1 includes an engine 2, an automatic transmission 4 which converts the power of the engine 2 into an intended engine speed and into an intended torque for output, a differential gear 6 which transmits the power output from the automatic transmission 4 to driving wheels 8, and the driving wheels 8 which convey the power input via the differential gear 6 to the road surface for driving the vehicle 1. Further, an alternator 12 for supplying electric power to a battery 10, and an air conditioner 14 are installed in the vehicle 1. The power of the engine 2 is also transmitted to compressors of the alternator 12 and of the air conditioner 14.

The automatic transmission 4 is provided with a torque converter 16 to be coupled to the output shaft of the engine 2, a transmission mechanism 18 to be coupled to the output shaft of the torque converter 16, and an oil pump 20 for supplying hydraulic oil to the transmission mechanism 18. The torque converter 16 is provided with a torus 22 which transmits the power of the engine 2 to the transmission mechanism 18 by fluid, and a lockup clutch 24 which mechanically and directly connects between the engine 2 and the transmission mechanism 18. Further, the transmission mechanism 18 includes a planetary gear mechanism for switching variable gear positions. The transmission mechanism 18 changes the engine speed and the torque transmission ratio by changing combination of gears. Combination of gears is changed by using hydraulic oil to be supplied from the oil pump 20.

Next, an electrical configuration of the vehicle 1 including the engine speed display device is described.

Figure 2:
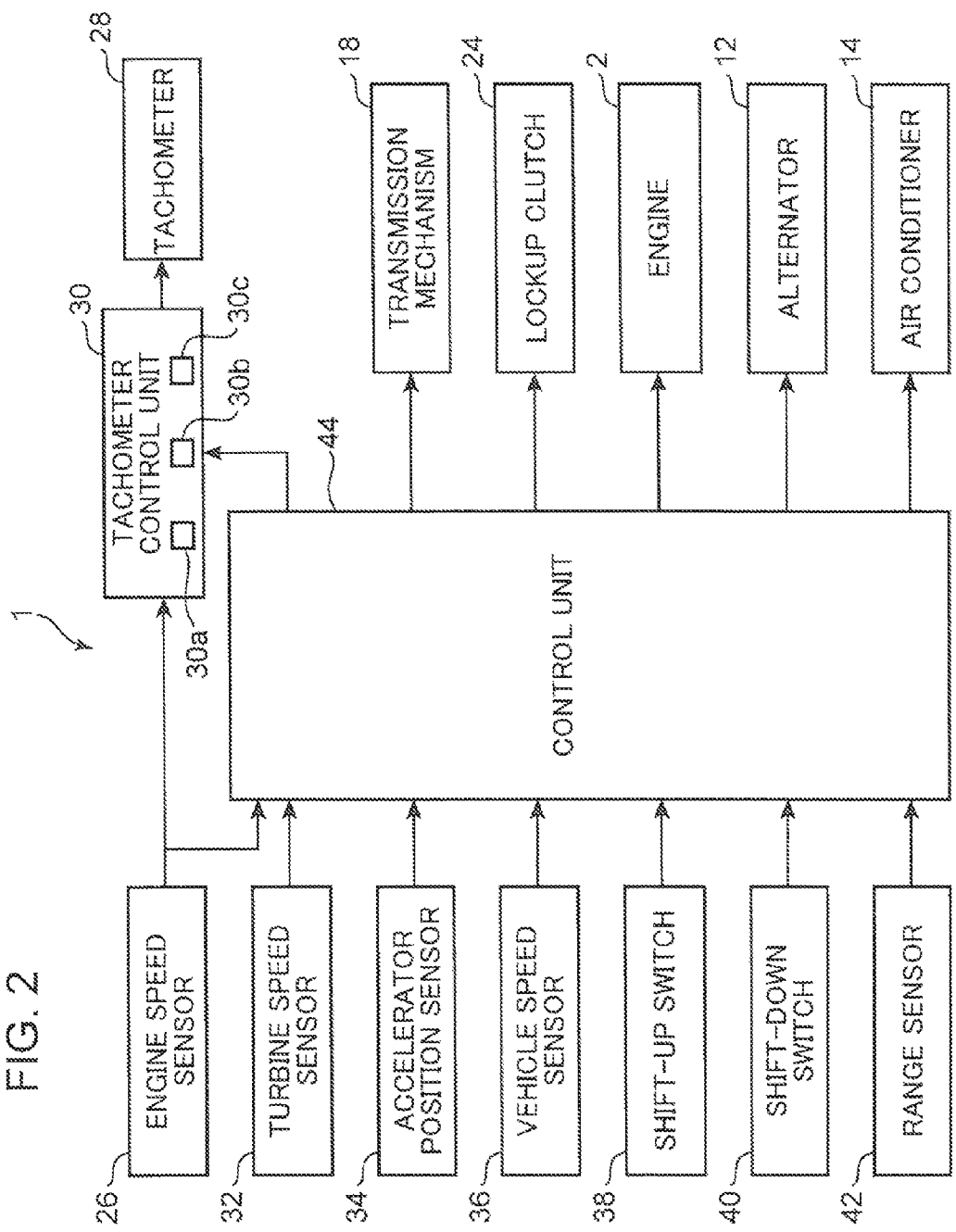
FIG. 2 is a block diagram illustrating an electrical configuration of the vehicle.

FIG. 2 is a block diagram illustrating the electrical configuration of the vehicle 1 including the engine speed display device. As illustrated in FIG. 2, the engine speed display device includes an engine speed sensor 26 which detects a rotational speed (engine speed) of the output shaft of the engine 2, a tachometer 28 which displays an engine speed, and a tachometer control unit 30 which controls display of the tachometer 28.

The engine speed sensor 26 corresponds to an "engine speed detection unit" in the claims. In the embodiment, the engine speed sensor 26 outputs a signal indicating an engine speed to the tachometer control unit 30 at a predetermined time interval (e.g. every 10 msec).

The tachometer 28 corresponds to an "engine speed display unit" in the claims. In the embodiment, the tachometer 28 is provided with a scale representing an engine speed, and a pointer which indicates the position of the scale associated with the engine speed.

The tachometer control unit 30 corresponds to a "display control unit" in the claims. In the embodiment, the tachometer control unit 30 controls the movement of the pointer of the tachometer 28 on the basis of an engine speed detected by the engine speed sensor 26. Further, the tachometer control unit 30 includes a smoothing calculation unit 30a, a phase determination unit 30b, and a responsiveness changing unit 30c, as functional elements thereof.

The smoothing calculation unit 30a executes a smoothing process of averaging time-series data on engine speeds detected by the engine speed sensor 26. More specifically, the smoothing calculation unit 30a executes a process of averaging data (time-series data) on engine speeds, which is input a certain number of times including latest input data, out of the engine speeds input from the engine speed sensor 26 at a predetermined time interval. The movement of the pointer of the tachometer 28 is controlled on the basis of the engine speed which has undergone the aforementioned smoothing process. The engine speeds are subjected to a smoothing process, because the pointer may swing too fast for the driver to visually perceive the pointer if the movement of the pointer of the tachometer 28 is controlled only with use of one-time data i.e. latest input data.

The phase determination unit 30*b* determines whether the phase of a gear shift operation is a torque phase or an inertia phase at the time of the gear shift operation of the automatic transmission 4. The torque phase is a time period from the time when a gear shift command is output or from the time when a predetermined state indicating start of gear shift control is confirmed to the time when an inertia phase starts. During the torque phase, a substantial gear ratio change is not yet performed. Therefore, the engine speed (or the turbine speed to be described later) does not greatly change. On the other hand, the inertia phase is a time period when the engine speed (or the turbine speed) changes after termination of the torque phase. During the inertia phase, a substantial gear ratio change is performed. Therefore, the engine speed (or the turbine speed) is sharply changed toward a target speed, which is associated with a gear ratio after the gear shift operation.

The responsiveness changing unit 30*c* sets the display responsiveness of the tachometer 28 with respect to the engine speed detected by the engine speed sensor 26 higher than the display responsiveness to be set when the phase of the gear shift operation is not an inertia phase, when the phase of the gear shift operation is determined to be an inertia phase by the phase determination unit 30*b*. More specifically, the responsiveness changing unit 30*c* enhances the display responsiveness of the tachometer 28 by reducing the smoothing amount to be calculated by the smoothing calculation unit 30*a* (in other words, by reducing the number of pieces of time-series data on engine speeds to be averaged).

Further, the vehicle 1 is installed with a turbine speed sensor 32 which detects a rotational speed (turbine speed) of the output shaft of the torque converter 16, an accelerator position sensor 34 which detects a stepping amount of an accelerator pedal, a vehicle speed sensor 36 which detects a speed of the vehicle 1, a shift-up switch 38 which accepts a manual operation for instructing the automatic transmission 4 to perform a shift-up operation, a shift-down switch 40 which accepts a manual operation for instructing the automatic transmission 4 to perform a shift-down operation, and a range sensor 42 which detects a range of a selector for use in operating the automatic transmission 4. Signals output from the sensors and the switches are input to a control unit 44.

The control unit 44 controls the transmission mechanism 18 and the lockup clutch 24 of the automatic transmission 4 the engine 2, the alternator 12, and the air conditioner 14 on the basis of input signals. Further, the control unit 44 outputs, to the tachometer control unit 30, a signal to be used as a reference when the tachometer control unit 30 controls display of the tachometer 28.

The control unit 44 is constituted by a computer provided with a CPU, various programs which are interpreted and executed on the CPU (including a basic control program such as an OS, and an application program to be activated on the OS for implementing a specific function), and an internal memory such as an ROM and an RAM for storing programs and various data. The control unit 44 has a function of controlling the automatic transmission 4 as described above. In this sense, the control unit 44 corresponds to an "automatic transmission control unit" in the claims.

Next, display control of the tachometer 28 to be performed by the tachometer control unit 30 is described.

Figure 3:
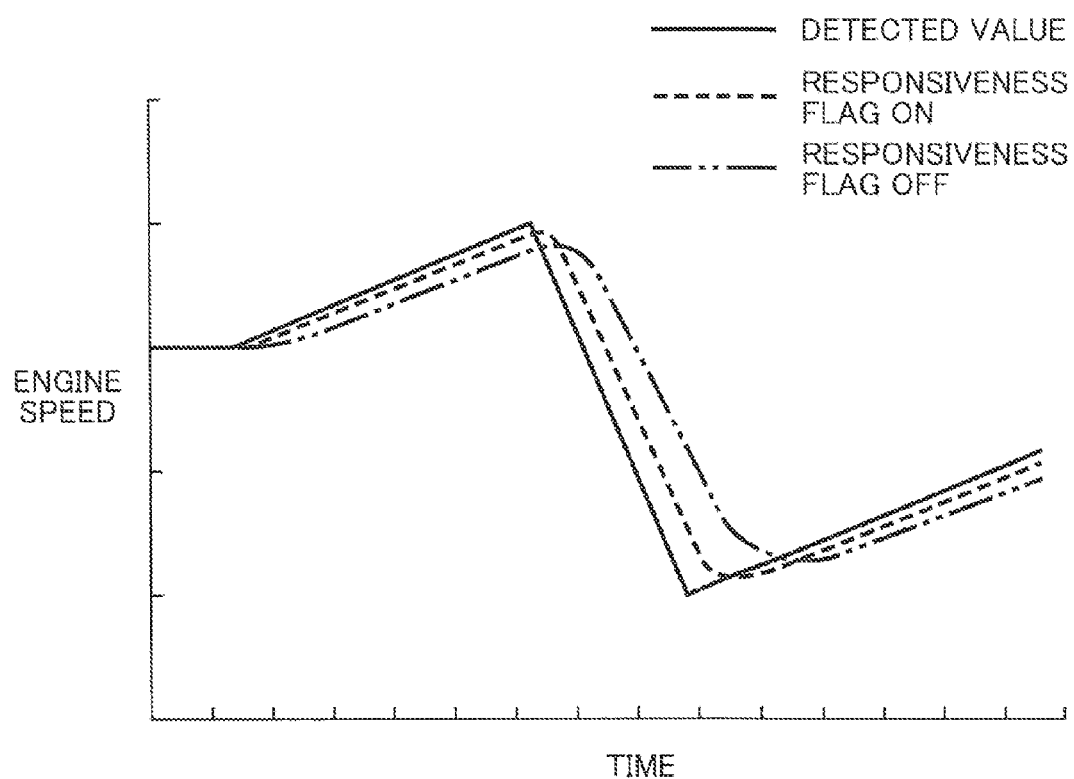
FIG. 3 is a line diagram illustrating a change in the engine speed at the time of a shift-up operation of an automatic transmission installed in the vehicle, and a change in the engine speed to be displayed on a tachometer when the responsiveness with respect to the engine speed is changed.

FIG. 3 is a line diagram illustrating a change in the engine speed at the time of a shift-up operation of the automatic transmission 4, and a change in the engine speed to be displayed on the tachometer 28 when the responsiveness with respect to the engine speed is changed.

The tachometer control unit 30 causes the tachometer 28 to display an engine speed detected by the engine speed sensor 26 in terms of predetermined responsiveness. The tachometer control unit 30 changes the display responsiveness, as the responsiveness flag to be set during engine speed display control (see FIG. 4) to be described later is set to ON/OFF.

Referring to FIG. 3, the solid line indicates a change in the actual engine speed to be detected by the engine speed sensor 26, the broken line indicates a change in the engine speed indicated by the pointer of the tachometer 28 when the responsiveness flag is set to ON, and the two-dotted chain line indicates a change in the engine speed indicated by the pointer of the tachometer 28 when the responsiveness flag is set to OFF.

As illustrated in FIG. 3, the tachometer control unit 30 sets the responsiveness of the tachometer 28 higher than the responsiveness to be set when the responsiveness flag is set to OFF, when the responsiveness flag is set to ON. Specifically, when the responsiveness flag is set to ON, the tachometer control unit 30 causes the pointer of the tachometer 28 to move faster to follow the engine speed change than when the responsiveness flag is set to OFF.

Next, engine speed display control to be performed by the tachometer control unit 30 is described.

Figure 4:
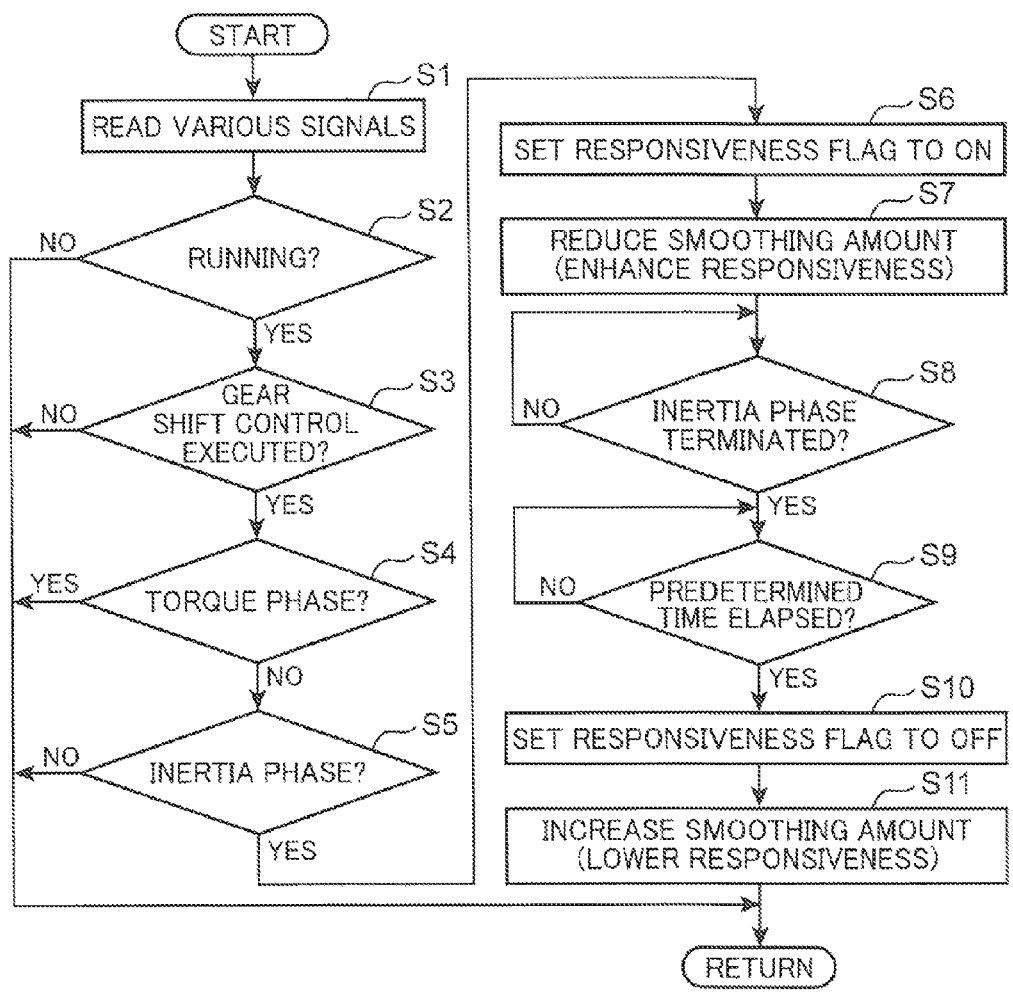
FIG. 4 is a flowchart illustrating the steps of engine speed display control to be performed by the engine speed display device.
Figure 5:
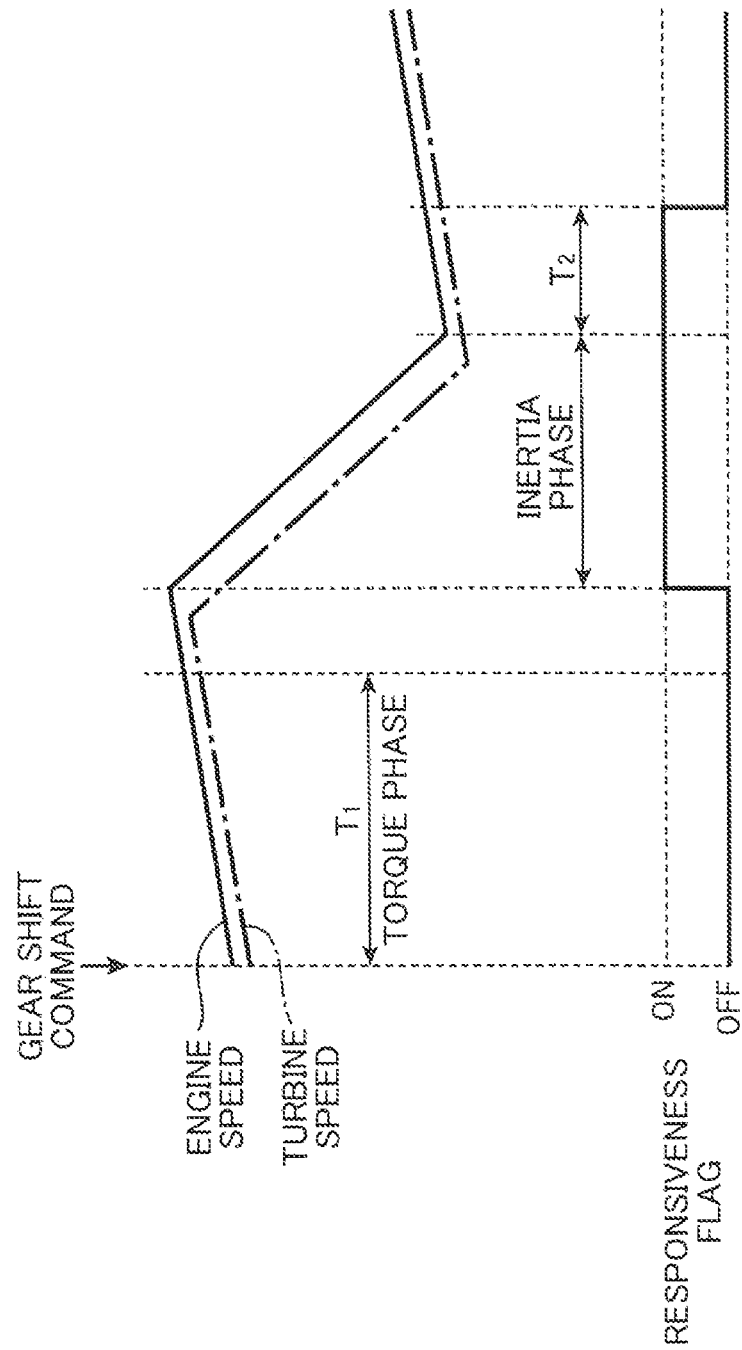
FIG. 5 is a timing chart illustrating a change in the engine speed and a change in the turbine speed at the time of a shift-up operation of the automatic transmission in association with a change in responsiveness flag.

FIG. 4 is a flowchart illustrating the steps of engine speed display control. FIG. 5 is a timing chart illustrating a change in the engine speed and a change in the turbine speed at the time of a shift-up operation of the automatic transmission 4 in association with a change in responsiveness flag. In FIG. 5, the horizontal axis indicates a time, and a vertical axis indicates an engine speed (indicated by the solid line), a turbine speed (indicated by the one-dotted chain line), and ON/OFF of the responsiveness flag.

Engine speed display control is started when the ignition of the vehicle 1 is turned on. Thereafter, the control is repeatedly executed. The responsiveness flag is set to OFF in advance when engine speed display control is started.

As illustrated in FIG. 4, when engine speed display control is started, the control unit 44 reads the signals output from the engine speed sensor 26, the turbine speed sensor 32, the accelerator position sensor 34, the vehicle speed sensor 36, the shift-up switch 38, the shift-down switch 40, and the range sensor 42 (Step S1).

Subsequently, the control unit 44 determines whether the vehicle 1 is running (Step S2). In the embodiment, the control unit 44 determines that the vehicle 1 is running when the vehicle speed detected by the vehicle speed sensor 36 is 5 km/h or more.

When it is determined that the vehicle 1 is not running (when the vehicle speed is smaller than 5 km/h), it is judged that the necessity of enhancing the display responsiveness of the tachometer 28 is low, because the rate of change in the engine speed at the time of a gear shift operation of the automatic transmission 4 is small. In view of the above, when it is determined NO in Step S2, the control unit 44 skips the steps after Step S2, and returns the flow to Step S1.

On the other hand, when it is determined YES in Step S2, and it is confirmed that the vehicle 1 is running (the vehicle speed is 5 km/h or more), the control unit 44 determines that gear shift control of the automatic transmission 4 is executed (Step S3). Specifically, the control unit 44 outputs a gear shift command to the automatic transmission 4 in accordance with a shift map for automatic transmission, which is prepared in advance, or in accordance with a manual operation input from the shift up switch 38 or from the shift down switch 40. Then, the control unit 44 determines that gear shift control of the automatic transmission 4 is executed during a time period from the time when the gear shift command is output to the time when hydraulic control of the transmission mechanism 18 by the oil pump 20 is completed.

When it is determined that gear shift control of the automatic transmission 4 is not being executed, it is judged that the necessity of enhancing the display responsiveness of the tachometer 28 is low, because the rate of change in the engine speed is low. In view of the above, when it is determined NO in Step S3, the control unit 44 skips the steps after Step S3, and returns the flow to Step S1.

On the other hand, when it is determined YES in Step S3, and it is confirmed that gear shift control of the automatic transmission 4 is executed, specifically, when the control unit 44 confirms that the vehicle 1 is in a time period after a gear shift command is input to the automatic transmission 4 and before hydraulic control of the transmission mechanism 18 by the oil pump 20 is completed, the phase determination unit 30b of the tachometer control unit 30 determines whether the phase of the gear shift operation of the automatic transmission 4 is a torque phase (Step S4).

Specifically, as illustrated in FIG. 5, the phase determination unit 30b of the tachometer control unit 30 determines that the phase of the gear shift operation of the automatic transmission 4 is a torque phase when a predetermined time period $T_1$ has not elapsed after gear shift control of the automatic transmission 4 is started in response to input of a gear shift command, and determines that the phase of the gear shift operation of the automatic transmission 4 is not a torque phase when the predetermined time period $T_1$ has elapsed.

When the phase of the gear shift operation is a torque phase, it is judged that the necessity of enhancing the display responsiveness of the tachometer 28 is low, because the rate of change in the engine speed is low. In view of the above, when it is determined YES in Step S4, the tachometer control unit 30 skips the steps after Step S4, and returns the flow to Step S1.

On the other hand, when it is determined NO in Step S4, and it is confirmed that the phase of the gear shift operation is not a torque phase, the phase determination unit 30b of the tachometer control unit 30 determines whether the phase of the gear shift operation is an inertia phase (Step S5). Specifically, the phase determination unit 30b of the tachometer control unit 30 determines that the phase of the gear shift operation is an inertia phase when the engine speed detected by the engine speed sensor 26 is changed toward a target speed after the gear shift operation of the automatic transmission 4 (when the engine speed decreases at the time of a shift-up operation, or when the engine speed increases at the time of a shift-down operation). The target speed after the gear shift operation of the automatic transmission 4 is calculated from a vehicle speed, a gear ratio after the gear shift operation of the automatic transmission 4, and a final speed reduction ratio.

For instance, as illustrated in FIG. 5, at the time of a shift-up operation, the phase determination unit 30b of the tachometer control unit 30 determines that the phase of the gear shift operation is an inertia phase when the engine speed detected by the engine speed sensor 26 decreases.

When the phase of the gear shift operation is not an inertia phase (a time period when the engine speed sharply changes), it is judged that the necessity of enhancing the display responsiveness of the tachometer 28 is low. In view of the above, when it is determined NO in Step S5, the tachometer control unit 30 skips the steps after Step S5, and returns the flow to Step S1.

On the other hand, when it is determined YES in Step S5, and it is confirmed that the phase of the gear shift operation is an inertia phase, as illustrated in FIG. 5, the phase determination unit 30b of the tachometer control unit 30 switches the responsiveness flag of the tachometer 28 from OFF to ON (Step S6).

In response to setting the responsiveness flag to ON, the responsiveness changing unit 30c of the tachometer control unit 30 enhances the display responsiveness of the tachometer 28 with respect to the engine speed detected by the engine speed sensor 26 (Step S7). Specifically, the responsiveness changing unit 30c of the tachometer control unit 30 enhances the display responsiveness of the tachometer 28 by reducing the smoothing amount to be calculated by the smoothing calculation unit 30a in subjecting the engine speeds detected by the engine speed sensor 26 to a smoothing process.

Subsequently, the phase determination unit 30b of the tachometer control unit 30 determines whether the inertia phase is terminated (Step S8). Specifically, the phase determination unit 30b of the tachometer control unit 30 determines that the inertia phase is terminated when the engine speed change toward the target speed after the gear shift operation of the automatic transmission 4 is terminated (when decrease of the engine speed is terminated at the time of a shift-up operation, or when increase of the engine speed is terminated at the time of a shift-down operation).

For instance, as illustrated in FIG. 5, at the time of a shift-up operation, the phase determination unit 30b of the tachometer control unit 30 determines that the inertia phase is terminated when the engine speed detected by the engine speed sensor 26 is shifted from decrease to increase.

When it is determined NO in Step S8, and it is confirmed that the inertia phase is not terminated, the phase determination unit 30b of the tachometer control unit 30 repeats Step S8 until the inertia phase is terminated.

On the other hand, when it is determined YES in Step S8, and it is confirmed that the inertia phase is terminated, the phase determination unit 30b of the tachometer control unit 30 determines whether a predetermined time period $T_2$ (e.g. 180 msec) has elapsed after it is determined that the inertia phase is terminated in Step S8 (Step S9).

When it is determined NO in Step S9 and it is confirmed that the predetermined time period $T_2$ has not elapsed after termination of the inertia phase, the phase determination unit 30b of the tachometer control unit 30 repeats Step S9 until the predetermined time period $T_2$ elapses.

On the other hand, when it is determined YES in Step S9, and the predetermined time period $T_2$ has elapsed after termination of the inertia phase, as illustrated in FIG. 5, the phase determination unit 30b of the tachometer control unit 30 switches the responsiveness flag of the tachometer 28 from ON to OFF (Step S10).

In response to setting the responsiveness flag to OFF, the responsiveness changing unit 30c of the tachometer control unit 30 lowers the display responsiveness of the tachometer 28 with respect to the engine speed detected by the engine speed sensor 26 (Step S11). Specifically, the responsiveness changing unit 30c of the tachometer control unit 30 returns the smoothing amount to be calculated by the smoothing calculation unit 30a with respect to the engine speeds to the initial value (namely, increases the smoothing amount, as compared with Step S7). Thus, the display responsiveness of the tachometer 28 is lowered.

FIG. 3 illustrates an engine speed change when the control of enhancing the display responsiveness on the engine speed is executed during an inertia phase at the time of a shift-up operation. Alternatively, it is possible to apply the control of enhancing the responsiveness at the time of a shift-down operation as well as at the time of a shift-up operation. It should be noted, however, the engine speed increases during an inertia phase at the time of a shift-down operation. Therefore, when the responsiveness is enhanced at the time of a shift-down operation, it is possible to display such that an engine speed increase is made clear.

Next, the advantageous effects of the vehicle engine speed display device in the first embodiment of the invention are described.

The tachometer control unit 30 reduces the smoothing amount in subjecting the engine speeds detected by the engine speed sensor 26 to a smoothing process when the phase of a gear shift operation is determined to be an inertia phase during the gear shift operation of the automatic transmission 4. This makes it possible to set the display responsiveness of the tachometer 28 higher than the display responsiveness to be set when the phase of the gear shift operation is not an inertia phase, when the phase of the gear shift operation is an inertia phase. Thus, it is possible to cause the tachometer 28 to display the engine speed in such a manner that a change in the engine speed is made clear at the time of a gear shift operation.

This allows for the driver to visually perceive a sharp change in the engine speed at the time of a gear shift operation from a display change of the tachometer 28.

In particular, the tachometer control unit 30 determines that the phase of the gear shift operation is an inertia phase when the engine speed is changed toward a target speed after the gear shift operation. Specifically, when the engine speed is changed to be away from the target speed, it is not determined that the phase of the gear shift operation is an inertia phase. This makes it possible to prevent enhancement of the display responsiveness of the tachometer 28 when the engine speed is changed to be away from the target speed. According to this configuration, it is possible to keep the driver from feeling strangeness in a sharp engine speed change such that the engine speed is away from the target speed after a gear shift operation.

Further, the tachometer control unit 30 determines whether the phase of the gear shift operation is an inertia phase when the phase of the gear shift operation is determined not to be a torque phase. Specifically, the tachometer control unit 30 does not determine whether the phase of the gear shift operation is an inertia phase during a torque phase. This makes it possible to prevent erroneous determination that the phase of the gear shift operation is an inertia phase when the engine speed is changed toward a target speed after the gear shift operation by the driver's acceleration operation during a torque phase. This makes it possible to prevent enhancement of the display responsiveness of the tachometer 28 regardless that the phase is not an inertia phase.

Further, the tachometer control unit 30 determines whether the phase of the gear shift operation is a torque phase on the basis of an elapse of a predetermined time period after the time when gear shift control of the automatic transmission 4 is started. This makes it possible to determine whether the phase of a gear shift operation is a torque phase by a simplified method.

Second Embodiment

In this section, a vehicle engine speed display device in the second embodiment of the invention is described. The second embodiment is basically the same as the first embodiment except for a configuration of changing the responsiveness of a tachometer 28. Therefore, in this section, a control operation relating to changing the responsiveness is mainly described.

Figure 6:
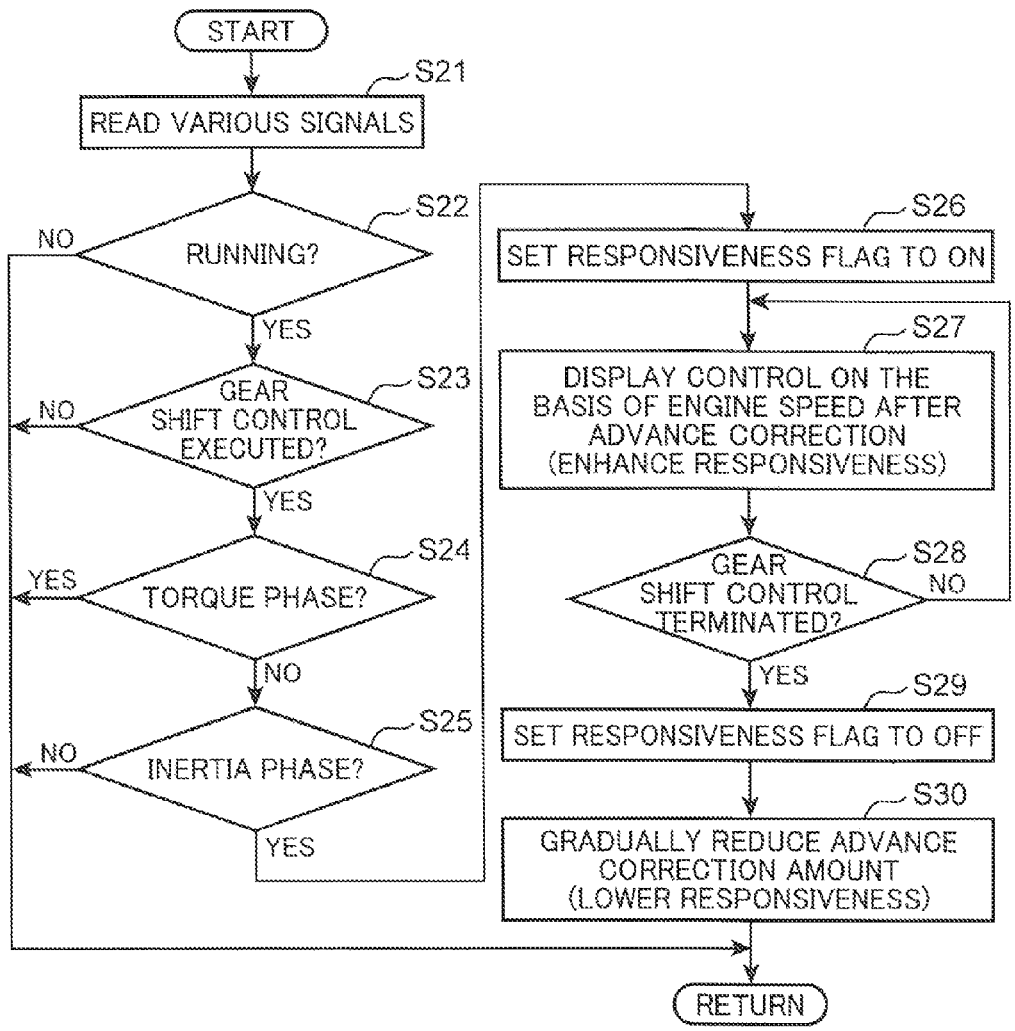
FIG. 6 is a flowchart illustrating the steps of engine speed display control to be performed by a vehicle engine speed display device in a second embodiment of the invention.
Figure 7:
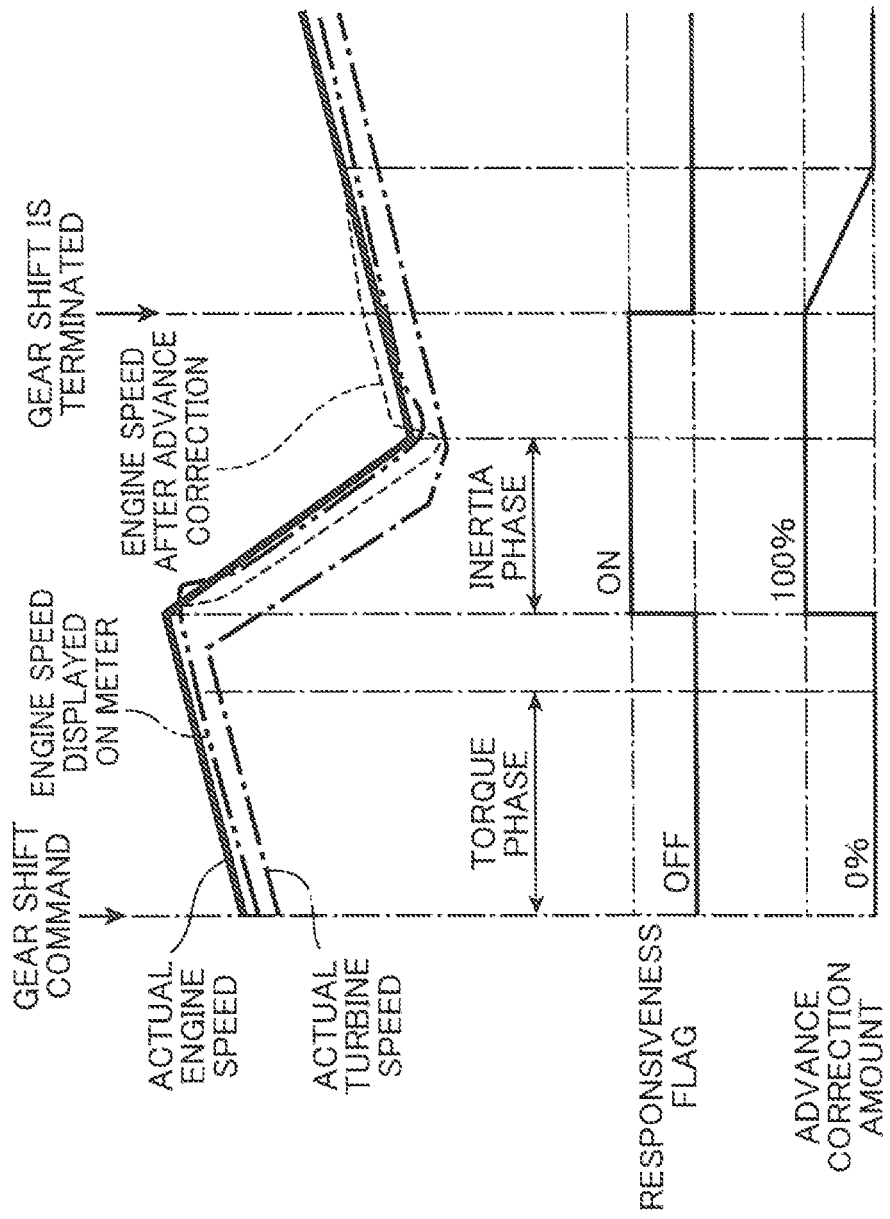
FIG. 7 is a timing chart illustrating a change in the engine speed and a change in the turbine speed at the time of a shift-up operation of an automatic transmission in association with a change in responsiveness flag in the second embodiment.

FIG. 6 is a flowchart illustrating the steps of engine speed display control. FIG. 7 is a timing chart illustrating a change in the engine speed and a change in the turbine speed at the time of a shift-up operation of an automatic transmission 4 in association with a change in responsiveness flag.

When the control illustrated in the flowchart of FIG. 6 is started, a control unit 44 or a tachometer control unit 30 reads signals output from various sensors or switches (Step S21). Subsequently, the control unit 44 or the tachometer control unit 30 determines whether a vehicle 1 is running (Step S22), determines whether gear shift control of the automatic transmission 4 is executed (Step S23), determines whether the phase of the gear shift operation is a torque phase (Step S24), and determines whether the phase of the gear shift operation is an inertia phase (Step S25). Since the controls of Steps S21 to S25 are the same as the controls of Steps S1 to S5 in the flowchart of FIG. 4 described in the first embodiment, detailed description about the respective steps is omitted herein.

When it is determined YES in Step S25, and it is confirmed that the phase of the gear shift operation is an inertia phase, as illustrated in FIG. 7, a phase determination unit 30b of the tachometer control unit 30 switches the responsiveness flag of the tachometer 28 from OFF to ON (Step S26).

In response to switching the responsiveness flag to ON, a responsiveness changing unit 30c of the tachometer control unit 30 enhances the display responsiveness of the tachometer 28 with respect to the engine speed detected by an engine speed sensor 26 (Step S27). Specifically, the responsiveness changing unit 30c of the tachometer control unit 30 estimates an engine speed after elapse of a predetermined estimation time period (e.g. from 70 to 90 msec) on the basis of the engine speed detected by the engine speed sensor 26, and enhances the display responsiveness of the tachometer 28 by controlling the movement of the pointer of the tachometer 28 on the basis of the estimated value of the engine speed. In the following, the operation of estimating the engine speed after elapse of the predetermined estimation time period is called as "advance correction", and an estimated value of the engine speed is called as an "engine speed after advance correction".

For instance, when it is assumed that a time interval at which a smoothing calculation unit 30a of the tachometer control unit 30 calculates an engine speed which has undergone a smoothing process is $\Delta t$ (e.g. 10 msec), a latest calculated value of the engine speed by the smoothing calculation unit 30a is n1, a calculated value immediately before the latest calculated value is n2, and the estimation time period is T, it is possible to calculate an engine speed n' after advance correction by the following equation (1).

$$n'=n1+(n1-n2)\times(T/\Delta t) \qquad (1)$$

In the timing chart illustrating a condition at a shift-up operation as exemplified in FIG. 7, the broken-line curve illustrates a value of the engine speed after advance correction. As illustrated in FIG. 7, the value of the engine speed after advance correction is calculated to be smaller than the actual engine speed illustrated by the solid-line curve (namely, the actual engine speed to be detected by the engine speed sensor 26) during the inertia phase when the engine speed is lowered. On the other hand, when the actual engine speed increases after termination of an inertia phase, the value of the engine speed after advance correction is calculated to be higher than the actual engine speed.

Further, in FIG. 7, the two-dotted chain line curve indicates a value of the engine speed to be displayed on the tachometer 28. Controlling the movement of the pointer of the tachometer 28 on the basis of the value of the engine speed after advance correction as described above makes it possible to display a change in the value of the engine speed (the value indicated by the pointer) to be displayed on the tachometer 28 substantially without a delay with respect to the actual engine speed. In other words, the display responsiveness is enhanced.

The value of the engine speed to be displayed on the tachometer 28 is changed with a slight delay, as compared with the value of the engine speed after advance correction. This is because the movement of the pointer of the tachometer 28 is slightly delayed by the inertia of the pointer itself. As a result, if advance correction of the engine speed is not performed, movement of the pointer follows with a delay with respect to a change in the actual engine speed (e.g. see the two-dotted chain line illustrated in FIG. 3). On the other hand, in the example of FIG. 7, the delay is substantially cancelled by appropriately setting an advance correction amount of the engine speed. This allows for the pointer to accurately move while following a change in the actual engine speed.

After the control of enhancing the display responsiveness of the tachometer 28 is started as described above, the control unit 44 determines whether the gear shift control of the automatic transmission 4 is terminated (Step S28). This determination is made on the basis of e.g. a hydraulic pressure (a line pressure) to be supplied from an oil pump 20 to a planetary gear mechanism of a transmission mechanism 18.

When it is determined YES in Step S28, and it is confirmed that the gear shift control is terminated, as illustrated in FIG. 7, the phase determination unit 30b of the tachometer control unit 30 switches the responsiveness flag of the tachometer 28 from ON to OFF (Step S29).

In response to switching of the responsiveness flag to OFF, the responsiveness changing unit 30c of the tachometer control unit 30 gradually lowers the display responsiveness of the tachometer 28 with respect to the engine speed detected by the engine speed sensor 26 (Step S30). Specifically, the responsiveness changing unit 30c of the tachometer control unit 30 gradually reduces the advance correction amount of the engine speed. In other words, the responsiveness changing unit 30c of the tachometer control unit 30 gradually reduces the estimation time period T in equation (1) so that the advance correction amount becomes zero. This makes it possible to gradually lower the display responsiveness of the tachometer 28. When the advance correction amount becomes zero, it is possible to control the movement of the pointer of the tachometer 28 solely on the basis of a value obtained by subjecting the engine speeds detected by the engine speed sensor 26 to a smoothing process. This allows for the tachometer 28 to return to a normal state, in which the pointer moves while following a change in the actual engine speed with a delay.

FIG. 7 is illustrated based on the assumption that the advance correction amount when the responsiveness flag is set to ON accompanied by shift of the phase to the inertia phase is 100%. Thereafter, when the gear shift control is terminated, and the responsiveness flag is set to OFF, the control of Step S30 is started. Then, the advance correction amount is gradually reduced, and finally becomes 0%. In other words, after the responsiveness flag is set to OFF, the value of the engine speed after advance correction gradually approaches the actual engine speed.

FIG. 7 illustrates a change in the engine speed when the control of enhancing the display responsiveness of the engine speed is executed during an inertia phase at the time of a shift-up operation. Alternatively, it is possible to execute the control of enhancing the responsiveness at the time of a shift-down operation, as well as at the time of a shift-up operation.

According to the vehicle engine speed display device in the second embodiment as described above, the tachometer 28 is controlled on the basis of an advance corrected value, which is obtained by subjecting the engine speed detected by the engine speed sensor 26 to advance correction, when it is determined that the phase of the gear shift operation is an inertia phase. This makes it possible to enhance the display responsiveness of the tachometer 28 when the phase of a gear shift operation is an inertia phase, and to cause the tachometer 28 to display the engine speed in such a manner that a change in the engine speed at the time of the gear shift operation is made clear.

In the second embodiment, in Step S28 of FIG. 6, determination is made as to whether gear shift control is actually terminated on the basis of a hydraulic pressure, and the responsiveness flag is set to OFF at the time when termination of the gear shift control is confirmed (Step S29). Alternatively, it is possible to determine whether the inertia phase is terminated on the basis of a change in the actual engine speed, and it is possible to set the responsiveness flag to OFF at the time when the inertia phase is terminated. Further alternatively, as well as the first embodiment, it is possible to set the responsiveness flag to OFF at the time after elapse of a predetermined time period from termination of an inertia phase.

Further, in the second embodiment, the engine speed after elapse of a predetermined estimation time period (e.g. from 70 to 90 msec) is estimatively calculated on the basis of data (values that have been extracted two times in the past) on engine speeds, which are calculated at a predetermined time interval and which have undergone a smoothing process (see the equation (1)). Then, the estimated engine speed is used as the engine speed after advance correction. Various methods other than the aforementioned advance correction method may be used. For instance, it is possible to use values that have been extracted three times or more in the past, as the data on engine speeds, which are used for estimative calculation and which have undergone a smoothing process.

Further alternatively, it is possible to obtain an engine speed after elapse of the predetermined estimation time period (e.g. from 70 to 90 msec) on the basis of the tendency on a change in the actual engine speed, which is detected by the engine speed sensor 26 for a predetermined time period in the past, and to use the obtained engine speed as the engine speed after advance correction.

Further alternatively, it is possible to set the predetermined estimation time period variable. For instance, when the sports mode (manual mode) is selected as the gear shift mode of the automatic transmission, it is possible to set the estimation time period longer than the estimation time period in the normal mode, for instance, in the range of from 90 to 110 msec.

Third Embodiment

In this section, a vehicle engine speed display device in the third embodiment of the invention is described. The third embodiment is basically the same as the first embodiment except for a configuration of changing the responsiveness of a tachometer 28. Therefore, in this section, a control operation relating to changing the responsiveness is mainly described.

Figure 8:
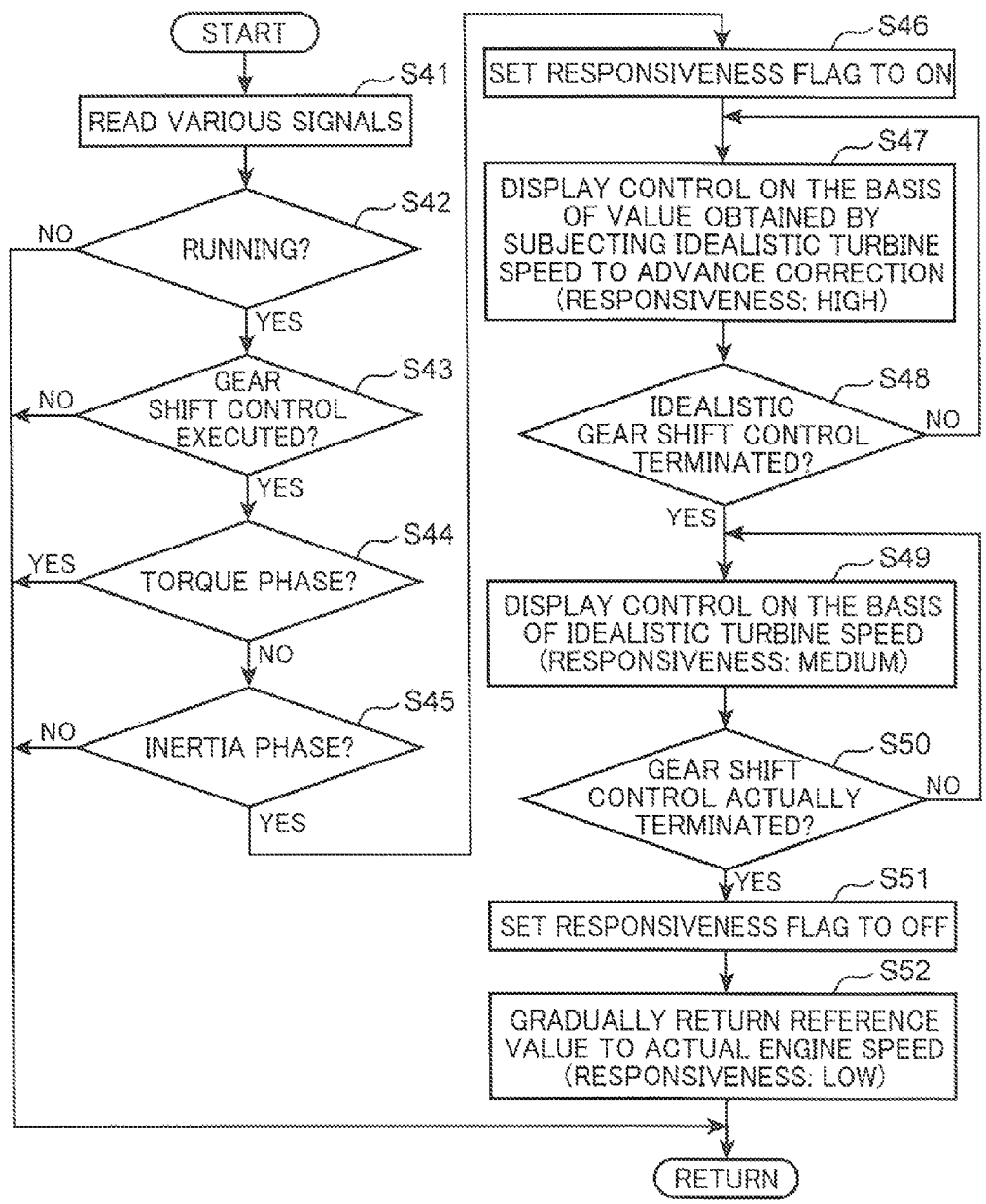
FIG. 8 is a flowchart illustrating the steps of engine speed display control to be performed by a vehicle engine speed display device in a third embodiment of the invention.
Figure 9:
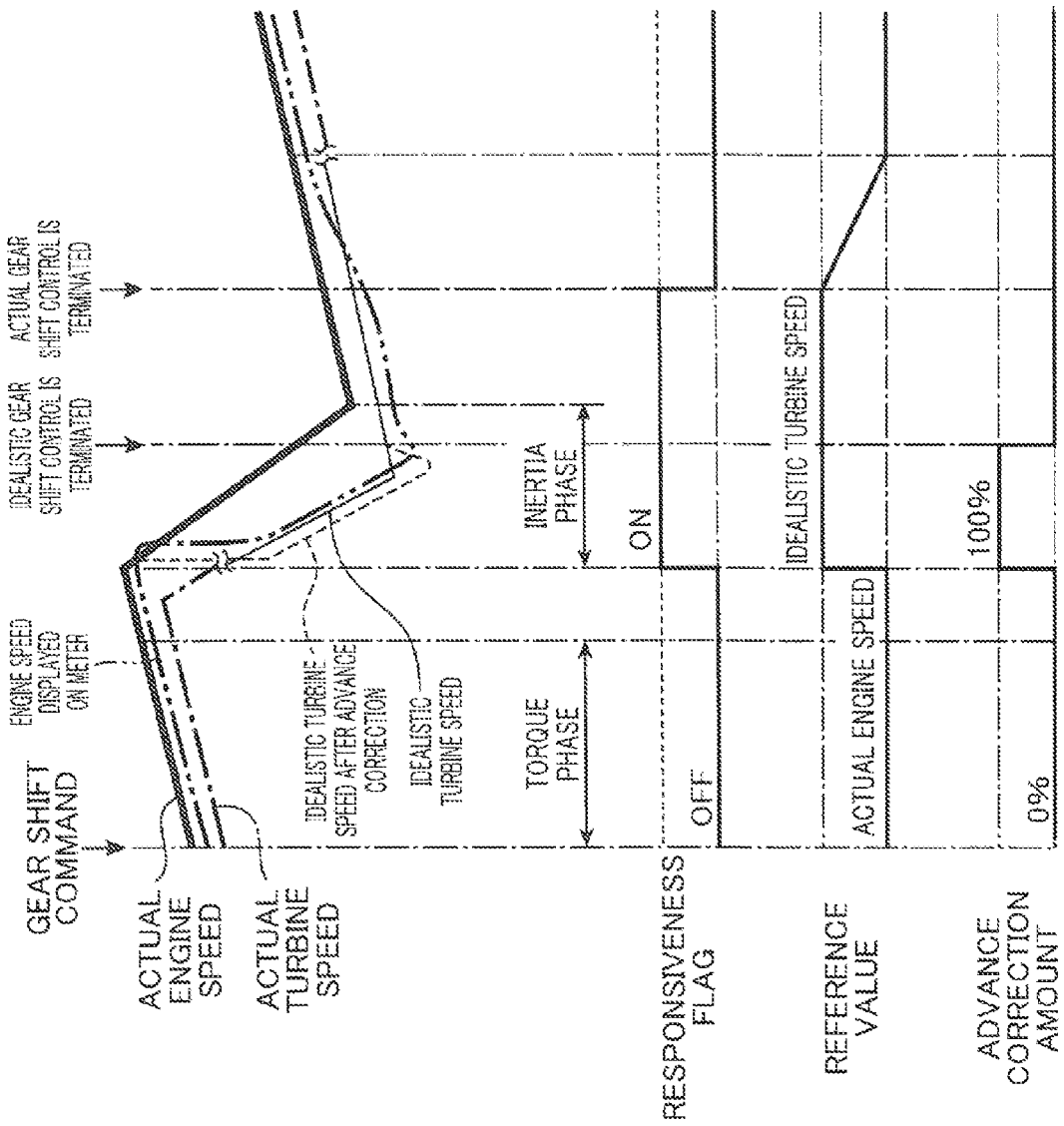
FIG. 9 is a timing chart illustrating a change in the engine speed and a change in the turbine speed at the time of a shift-up operation of an automatic transmission in association with a change in responsiveness flag in the third embodiment.

FIG. 8 is a flowchart illustrating the steps of engine speed display control. FIG. 9 is a timing chart illustrating a change in the engine speed and a change in the turbine speed at the time of a shift-up operation of an automatic transmission 4 in association with a change in responsiveness flag.

When the control illustrated in the flowchart of FIG. 8 is started, a control unit 44 or a tachometer control unit 30 reads signals output from various sensors or switches (Step S41). Subsequently, the control unit 44 or the tachometer control unit 30 determines whether a vehicle 1 is running (Step S42), determines whether gear shift control of the automatic transmission 4 is executed (Step S43), determines whether the phase of the gear shift operation is a torque phase (Step S44), and determines whether the phase of the gear shift operation is an inertia phase (Step S45). Since the controls of Steps S41 to S45 are the same as the controls of Steps S1 to S5 in the flowchart of FIG. 4 described in the first embodiment, detailed description about the respective steps is omitted herein.

When it is determined YES in Step S45, and it is confirmed that the phase of the gear shift operation is an inertia phase, as illustrated in FIG. 9, a phase determination unit 30b of the tachometer control unit 30 switches the responsiveness flag of the tachometer 28 from OFF to ON (Step S46).

In response to switching the responsiveness flag to ON, a responsiveness changing unit 30c of the tachometer control unit 30 enhances the display responsiveness of the tachometer 28 (Step S47). Specifically, the responsiveness changing unit 30c of the tachometer control unit 30 enhances the display responsiveness of the tachometer 28 by controlling the movement of the pointer of the tachometer 28 on the basis of a value obtained by subjecting an idealistic turbine speed (corresponding to a "simulation speed" in the claims), which is an idealistic turbine speed at the time of a gear shift operation, to advance correction.

The idealistic turbine speed at the time of a gear shift operation is a rotational speed of the output shaft of a torque converter 16 when an idealistic gear shift operation without a delay is performed. It is possible to obtain the idealistic turbine speed at the time of a gear shift operation by a predetermined calculation. For instance, it is possible to obtain the idealistic turbine speed at a time immediately before the phase is shifted to an inertia phase by using a gear ratio of a transmission mechanism 18 before a gear shift operation is performed, and a vehicle speed at a time immediately before the phase is shifted to the inertia phase. Further, it is possible to obtain a gradient (a rate of change) of the idealistic turbine speed that is changed during the inertia phase by using a theoretically shortest time period (an idealistic gear shift time period) required for switching the combination of gears of a planetary gear mechanism of the transmission mechanism 18, and a gear ratio after the gear shift operation. Further, it is possible to obtain an idealistic turbine speed after a gear shift operation by using a gear ratio after the gear shift operation, and a vehicle speed. In order to obtain the idealistic turbine speed by the aforementioned calculations, for instance, a gear ratio for each of gear positions, and an idealistic gear shift time period required for performing a gear shift operation between the gear positions are stored in advance in a storage unit of the control unit 44.

In FIG. 9, the thick one-dotted chain line curve indicates an actual turbine speed (an actual turbine speed to be detected by a turbine speed sensor 32), and the thin solid-line curve indicates an idealistic turbine speed. In FIG. 9, illustration of the turbine speed is switched from the actual turbine speed (see the thick one-dotted chain line) to the idealistic turbine speed (see the thin solid line) at a time immediately after the phase is shifted to an inertia phase in order to clarify that a reference value for use in controlling display of the tachometer 28 is switched to the idealistic turbine speed from the time immediately after the phase is shifted to an inertia phase. The idealistic turbine speed is a speed to be obtained when a gear shift operation is performed within a theoretically shortest time period (an idealistic gear shift time period). Therefore, the gradient of the idealistic turbine speed is larger (sharper) than the gradient of the actual turbine speed.

Further, in FIG. 9, the broken line curve indicates a value obtained by subjecting the idealistic turbine speed to advance correction. Advance correction in this example is used to estimate an idealistic turbine speed at a time advanced from the current time by a predetermined time period (e.g. from 70 to 90 msec) on the basis of the change in the idealistic turbine speed in the past.

Controlling the movement of the pointer of the tachometer 28 on the basis of the value of the idealistic turbine speed after advance correction as described above makes it possible to change the value (see the two-dotted chain line) of the engine speed to be displayed on the tachometer 28 with respect to the idealistic turbine speed substantially without a delay. In other words, the display responsiveness is enhanced.

After the control of enhancing the display responsiveness of the tachometer 28 is started as described above, the control unit 44 determines whether the idealistic gear shift time period has elapsed from the time when the phase is shifted to an inertia phase, in other words, whether the idealistic time for terminating the gear shift control has come (Step S48).

When it is determined YES in Step S48 and it is confirmed that the idealistic time for terminating the gear shift control has come, the responsiveness changing unit 30c of the tachometer control unit 30 enhances the display responsiveness of the tachometer 28 by controlling the movement of the pointer of the tachometer 28 on the basis of the idealistic turbine speed (Step S49). However, unlike Step S47, in Step S49, the idealistic turbine speed is not subjected to advance correction. Therefore, the display responsiveness may be lowered, as compared with the display responsiveness to be obtained when advance correction is performed in Step S47.

FIG. 9 is illustrated based on the assumption that the advance correction amount is 100% when the responsiveness flag is set to ON accompanied by shift of the phase to an inertia phase. Thereafter, when the idealistic time for terminating the gear shift control has come, and the control of Step S49 is executed, the advance correction amount is instantaneously lowered to 0%. As the advance correction amount is lowered, the speed display on the tachometer 28 follows the change in the idealistic turbine speed with a slight delay. In other words, the responsiveness is lowered. However, the change in the idealistic turbine speed is faster than the change in the actual engine speed. Therefore, it can be said that the responsiveness is high, as compared with a configuration of controlling the display of the tachometer 28 on the basis of an actual engine speed, even when the advance correction amount becomes 0%.

As described above, when the control of enhancing the responsiveness to a medium level is started, the control unit 44 determines whether the gear shift control of the automatic transmission 4 is actually terminated (Step S50). This determination is made on the basis of a hydraulic pressure (a line pressure) to be supplied from an oil pump 20 to the planetary gear mechanism of the transmission mechanism 18.

When it is determined YES in Step S50, and it is confirmed that gear shift control is actually terminated, as illustrated in FIG. 9, the phase determination unit 30*b* of the tachometer control unit 30 switches the responsiveness flag of the tachometer 28 from ON to OFF (Step S51).

In response to switching the responsiveness flag to OFF, the responsiveness changing unit 30*c* of the tachometer control unit 30 gradually lowers the display responsiveness of the tachometer 28 (Step S52). Specifically, the responsiveness changing unit 30*c* of the tachometer control unit 30 lowers the display responsiveness of the tachometer 28 by gradually returning the reference value for use in controlling display of the tachometer 28 from the idealistic turbine speed to the actual engine speed. For instance, as illustrated in FIG. 9, the reference value for use in controlling display of the tachometer 28 is gradually returned from the idealistic turbine speed to the actual engine speed by executing a process of gradually changing the weighting between the idealistic turbine speed and the actual engine speed from 100:0 to 0:100.

FIG. 9 illustrates an engine speed change when the control of enhancing the display responsiveness of the engine speed is executed during an inertia phase at the time of a shift-up operation. Alternatively, it is possible to apply the control of enhancing the responsiveness at the time of a shift-down operation as well as at the time of a shift-up operation. It should be noted, however, the engine speed may be temporarily increased before a gear shift operation at the time of a shift-down operation. In some cases, a change in the actual engine speed is faster than a change in the idealistic turbine speed. In view of the above, in the aforementioned case, display of the tachometer 28 may be controlled on the basis of the actual engine speed, in place of the idealistic turbine speed.

According to the vehicle engine speed display device in the third embodiment as described above, when it is determined that the phase of a gear shift operation is an inertia phase, the tachometer 28 is controlled on the basis of an idealistic turbine speed (a simulation speed), which is independent of a detected value of an engine speed by an engine speed sensor 26. Therefore, it is possible to enhance the display responsiveness of the tachometer 28 when the phase of a gear shift operation is an inertia phase, and to display the engine speed on the tachometer 28 in such a manner that a change in the engine speed at the time of the gear shift operation is made clear.

In each of the aforementioned embodiments, the phase determination unit 30*b* of the tachometer control unit 30 determines that the phase of a gear shift operation is an inertia phase when the engine speed detected by the engine speed sensor 26 is changed toward a target speed after the gear shift operation of the automatic transmission 4, and determines that the inertia phase is terminated when the change in the engine speed toward the target speed after the gear shift operation of the automatic transmission 4 is terminated. Alternatively, start and termination of the inertia phase may be determined on the basis of a turbine speed detected by the turbine speed sensor 32. Specifically, the phase determination unit 30*b* of the tachometer control unit 30 may determine that the phase of a gear shift operation is an inertia phase when the turbine speed detected by the turbine speed sensor 32 is changed toward a target speed after a gear shift operation of the automatic transmission 4, and may determine that the inertia phase is terminated when the change in the turbine speed toward the target speed after the gear shift operation of the automatic transmission 4 is terminated.

Further, in each of the aforementioned embodiments, the tachometer control unit 30 including the smoothing calculation unit 30*a*, the phase determination unit 30*b*, and the responsiveness changing unit 30*c* is provided independently of the control unit 44. Alternatively, the smoothing calculation unit 30*a*, the phase determination unit 30*b*, and the responsiveness changing unit 30*c* may be integrally provided with the control unit 44.

Further, in each of the aforementioned embodiments, after the gear shift control of the automatic transmission 4 is started, it is determined whether the phase of the gear shift operation is a torque phase. Then, it is determined whether the phase of the gear shift operation is an inertia phase when it is confirmed that the phase of the gear shift operation is not a torque phase by the determination. Alternatively, in various configurations other than the configurations of the embodiments, determination on an inertia phase may be started in any condition. For instance, determination on an inertia phase may be started immediately after it is confirmed that gear shift control is started, without performing determination on a torque phase. Further, in the embodiments, it is determined that gear shift control is started (in other words, gear shift control is executed) when a gear shift command is input to the automatic transmission 4. Alternatively, it is possible to determine whether gear shift control is executed on the basis of an amount of a certain state relating to gear shift control. Information on a gear shift command is not necessarily required. In this case, it is also possible to omit determination on a torque phase.

Further, various modifications may be applied to the method for determining whether the phase is an inertia phase. Specifically, in the embodiments, the phase is determined to be an inertia phase when the engine speed is changed toward a target speed after a gear shift operation. A target speed after a gear shift operation (a speed after a gear shift operation, which is calculated from a vehicle speed, a gear ratio after a gear shift operation, and a final speed reduction ratio) is not necessarily required. For instance, it is possible to determine whether a gear shift operation is a shift-up operation or a shift-down operation on the basis of a gear shift operation by the driver, in place of calculating a target speed after a gear shift operation. When the speed decreases in a state that the gear shift operation is determined to be a shift-up operation, or when the speed increases in a state that the gear shift operation is determined to be a shift-down operation, it is possible to determine that the phase of the gear shift operation is an inertia phase.

In any case, a method for determining whether the phase of a gear shift operation is an inertia phase is not specifically limited, as far as it is possible to confirm that the engine speed (or the turbine speed) accompanied by a gear shift operation has changed.

Summary of Invention

The following is a summary of the features and the advantageous effects of the embodiments as described above.

A vehicle engine speed display device according to each of the embodiments is installed in a vehicle provided with an engine, an automatic transmission coupled to the engine, and an automatic transmission control unit for controlling the automatic transmission. The display device includes an engine speed detection unit which detects an engine speed; an engine speed display unit which displays an engine speed; and a display control unit which controls display of the engine speed display unit on the basis of the engine speed detected by the engine speed detection unit. The display control unit includes a phase determination unit which determines whether a phase of a gear shift operation of the automatic transmission is an inertia phase when gear shift control of the automatic transmission is executed by the automatic transmission control unit; and a responsiveness changing unit which sets display responsiveness of the engine speed display unit with respect to the engine speed detected by the engine speed detection unit higher than display responsiveness to be set when the phase of the gear shift operation is not the inertia phase, when the phase of the gear shift operation is determined to be the inertia phase by the phase determination unit.

In the display device having the aforementioned configuration, the display responsiveness of the engine speed display unit with respect to the engine speed detected by the engine speed detection unit is set higher than the display responsiveness to be set when the phase of the gear shift operation is not the inertia phase, when the phase of the gear shift operation is determined to be the inertia phase (a time period when the engine speed is changed accompanied by a gear shift operation) after the gear shift control of the automatic transmission is started. This is advantageous in causing the engine speed display unit to display the engine speed in such a manner than a change in the engine speed at the time of the gear shift operation is made clear.

According to the aforementioned configuration, the driver can visually perceive a sharp change in the engine speed at the time of a gear shift operation from a display change of the engine speed display unit.

Preferably, in the display device, the display control unit may include a smoothing calculation unit which executes a smoothing process of the engine speed detected by the engine speed detection unit. The responsiveness changing unit may set a smoothing amount to be calculated by the smoothing calculation unit smaller than a smoothing amount to be calculated when the phase of the gear shift operation is not the inertia phase, when the phase of the gear shift operation is determined to be the inertia phase by the phase determination unit, so as to enhance the display responsiveness of the engine speed display unit.

According to the aforementioned configuration, it is possible to securely enhance the display responsiveness when the phase of the gear shift operation is an inertia phase by reducing the smoothing amount to be calculated in subjecting a detected value of the engine speed to a smoothing process.

Preferably, in the display device, the phase determination unit may determine that the phase of the gear shift operation is the inertia phase when the engine speed detected by the engine speed detection unit is changed toward a target speed after the gear shift operation of the automatic transmission.

According to the aforementioned configuration, the phase determination unit determines that the phase of the gear shift operation is an inertia phase when the engine speed is changed toward the target speed after the gear shift operation. Specifically, when the engine speed is changed to be away from the target speed, it is not determined that the phase of the gear shift operation is an inertia phase. This makes it possible to prevent enhancement of the display responsiveness of the engine speed display unit when the engine speed is changed to be away from the target speed. Thus, it is possible to keep the driver from feeling strangeness in a sharp engine speed change such that the engine speed is away from the target speed after a gear shift operation.

Further, preferably, in the display device, the phase determination unit may determine whether the phase of the gear shift operation is a torque phase when the gear shift control of the automatic transmission is executed by the automatic transmission control unit, and may determine whether the phase of the gear shift operation is the inertia phase when it is confirmed that the phase of the gear shift operation is not the torque phase by the determination.

According to the aforementioned configuration, the phase determination unit determines whether the phase of the gear shift operation is an inertia phase when it is determined that the phase of the gear shift operation is not a torque phase. Specifically, the phase determination unit does not determine whether the phase of the gear shift operation is an inertia phase during a torque phase. This makes it possible to prevent erroneous determination by the phase determination unit that the phase is an inertia phase when the engine speed is changed toward a target speed after a gear shift operation by the driver's acceleration operation during a torque phase. This makes it possible to prevent enhancement of the display responsiveness of the engine speed display unit regardless that the phase is not an inertia phase.

Preferably, in the display device, the phase determination unit may determine that the phase of the gear shift operation is the torque phase until a predetermined time period elapses after a time when the gear shift control of the automatic transmission is started by the automatic transmission control unit, and may determine that the phase of the gear shift operation is not the torque phase after elapse of the predetermined time period.

According to the aforementioned configuration, the phase determination unit determines whether the phase of the gear shift operation is a torque phase on the basis of an elapse of the predetermined time period after the time when the gear shift control of the automatic transmission is started. This makes it possible to determine whether the phase is a torque phase by a simplified method.

Preferably, in the display device, the responsiveness changing unit may control the engine speed display unit on the basis of an advance corrected value when the phase of the gear shift operation is determined to be the inertia phase by the phase determination unit so as to enhance the display responsiveness of the engine speed display unit, the advance corrected value being a value obtained by subjecting the engine speed detected by the engine speed detection unit to advance correction.

According to the aforementioned configuration, it is possible to securely enhance the display responsiveness when the phase of the gear shift operation is an inertia phase by controlling the engine speed display unit on the basis of the advance corrected value obtained by subjecting the detected value of the engine speed to advance correction.

Preferably, in the display device, the responsiveness changing unit may control the engine speed display unit on the basis of a simulation speed different from a detected value of the engine speed detected by the engine speed detection unit when the phase of the gear shift operation is determined to be the inertia phase by the phase determination unit so as to enhance the display responsiveness of the engine speed display unit.

According to the aforementioned configuration, it is possible to securely enhance the display responsiveness when the phase of the gear shift operation is an inertia phase by controlling the engine speed display unit on the basis of the simulation speed different from the detected value of the engine speed.

Further, each of the embodiments relates to a control method for the engine speed display device having the aforementioned configuration. The control method includes a step of detecting an engine speed; and a step of controlling display of the engine speed display device on the basis of the detected engine speed. The step of controlling the display of the engine speed display device includes a step of determining whether a phase of a gear shift operation of the automatic transmission is an inertia phase when gear shift control of the automatic transmission is executed by the automatic transmission control unit; and a step of setting display responsiveness of the engine speed display device with respect to the detected engine speed higher than display responsiveness to be set when the phase of the gear shift operation is not the inertia phase, when the phase of the gear shift operation is determined to be the inertia phase.

The invention claimed is:

1. A vehicle engine speed display device installed in a vehicle provided with an engine, an automatic transmission coupled to the engine, and an automatic transmission control unit for controlling the automatic transmission, comprising:
an engine speed detection unit which detects an engine speed;
an engine speed display unit which displays an engine speed; and
a display control unit which controls display of the engine speed display unit on the basis of the engine speed detected by the engine speed detection unit, wherein
the display control unit includes:
a phase determination unit which determines whether a phase of a gear shift operation of the automatic transmission is an inertia phase when gear shift control of the automatic transmission is executed by the automatic transmission control unit;
a responsiveness changing unit which sets display responsiveness of the engine speed display unit with respect to the engine speed detected by the engine speed detection unit higher than display responsiveness to be set when the phase of the gear shift operation is not the inertia phase, when the phase of the gear shift operation is determined to be the inertia phase by the phase determination unit; and
a smoothing calculation unit which executes a smoothing process of the engine speed detected by the engine speed detection unit, and
the responsiveness changing unit sets a smoothing amount to be calculated by the smoothing calculation unit smaller than a smoothing amount to be calculated when the phase of the gear shift operation is not the inertia phase, when the phase of the gear shift operation is determined to be the inertia phase by the phase determination unit, so as to enhance the display responsiveness of the engine speed display unit.

2. The vehicle engine speed display device according to claim 1, wherein
the phase determination unit determines that the phase of the gear shift operation is the inertia phase when the engine speed detected by the engine speed detection unit is changed toward a target speed after the gear shift operation of the automatic transmission.

3. The vehicle engine speed display device according to claim 2, wherein
the phase determination unit determines whether the phase of the gear shift operation is a torque phase when the gear shift control of the automatic transmission is executed by the automatic transmission control unit, and determines whether the phase of the gear shift operation is the inertia phase when it is confirmed that the phase of the gear shift operation is not the torque phase by the determination.

4. The vehicle engine speed display device according to claim 3, wherein
the phase determination unit determines that the phase of the gear shift operation is the torque phase until a predetermined time period elapses after a time when the gear shift control of the automatic transmission is started by the automatic transmission control unit, and determines that the phase of the gear shift operation is not the torque phase after elapse of the predetermined time period.

5. A vehicle engine speed display device installed in a vehicle provided with an engine, an automatic transmission coupled to the engine, and an automatic transmission control unit for controlling the automatic transmission, comprising:
an engine speed detection unit which detects an engine speed;
an engine speed display unit which displays an engine speed; and
a display control unit which controls display of the engine speed display unit on the basis of the engine speed detected by the engine speed detection unit, wherein
the display control unit includes:
a phase determination unit which determines whether a phase of a gear shift operation of the automatic transmission is an inertia phase when gear shift control of the automatic transmission is executed by the automatic transmission control unit; and
a responsiveness changing unit which sets display responsiveness of the engine speed display unit with respect to the engine speed detected by the engine speed detection unit higher than display responsiveness to be set when the phase of the gear shift operation is not the inertia phase, when the phase of the gear shift operation is determined to be the inertia phase by the phase determination unit,
the responsiveness changing unit controls the engine speed display unit on the basis of an advance corrected value when the phase of the gear shift operation is determined to be the inertia phase by the phase determination unit so as to enhance the display responsiveness of the engine speed display unit, the advance corrected value being a value obtained by subjecting the engine speed detected by the engine speed detection unit to advance correction, and
the advance correction is a process of estimating the engine speed after elapse of a predetermined estimation time period from a current time on the basis of a change in an engine speed detected by the engine speed detection unit in the past.

6. A vehicle engine speed display device installed in a vehicle provided with an engine, an automatic transmission coupled to the engine, and an automatic transmission control unit for controlling the automatic transmission, comprising:
- an engine speed detection unit which detects an engine speed;
- an engine speed display unit which displays an engine speed; and
- a display control unit which controls display of the engine speed display unit on the basis of the engine speed detected by the engine speed detection unit, wherein the automatic transmission includes a transmission mechanism for switching variable gear positions, the display control unit includes:
- a phase determination unit which determines whether a phase of a gear shift operation of the automatic transmission is an inertia phase when gear shift control of the automatic transmission is executed by the automatic transmission control unit; and
- a responsiveness changing unit which sets display responsiveness of the engine speed display unit with respect to the engine speed detected by the engine speed detection unit higher than display responsiveness to be set when the phase of the gear shift operation is not the inertia phase, when the phase of the gear shift operation is determined to be the inertia phase by the phase determination unit, the responsiveness changing unit controls the engine speed display unit on the basis of a simulation speed different from a detected value of the engine speed detected by the engine speed detection unit when the phase of the gear shift operation is determined to be the inertia phase by the phase determination unit so as to enhance the display responsiveness of the engine speed display unit, and the simulation speed is a rotational speed of an input shaft of the transmission mechanism when an idealistic gear shift operation without a delay is performed.

7. The vehicle engine speed display device according to claim 6, wherein
the responsiveness changing unit enhances the display responsiveness of the engine speed display unit by controlling the engine speed display unit on the basis of a value obtained by subjecting the simulation speed to advance correction.

8. The vehicle engine speed display device according to claim 7, wherein
the advance correction is a process of estimating the simulation speed at a time advanced from a current time by a predetermined time period on the basis of a change in the simulation speed in the past.

9. The vehicle engine speed display device according to claim 8, wherein
the responsiveness changing unit terminates the advance correction of the simulation speed at an idealistic termination time at which the gear shift control by a theoretically shortest time period is terminated, and controls the engine speed display unit on the basis of a simulation speed which is not subjected to advance correction after the idealistic termination time.

10. The vehicle engine speed display device according to claim 9, wherein
the simulation speed is a value changed by a rate of change, the rate of change being determined on the basis of a theoretically shortest time period required for performing a gear shift operation, and a gear ratio after the gear shift operation is performed.

11. The vehicle engine speed display device according to claim 10, wherein
the responsiveness changing unit controls the engine speed display unit on the basis of a detected value of the engine speed and the simulation speed during a predetermined time period after a gear shift control is terminated, and gradually increases a weighting to be applied to the detected value of the engine speed as time elapses.

12. The vehicle engine speed display device according to claim 6, wherein
the responsiveness changing unit controls the engine speed display unit on the basis of a detected value of the engine speed and the simulation speed during a predetermined time period after a gear shift control is terminated, and gradually increases a weighting to be applied to the detected value of the engine speed as time elapses.

13. The vehicle engine speed display device according to claim 6, wherein
the simulation speed is a value changed by a rate of change, the rate of change being determined on the basis of a theoretically shortest time period required for performing a gear shift operation, and a gear ratio after the gear shift operation is performed.

14. The vehicle engine speed display device according to claim 13, wherein
the responsiveness changing unit controls the engine speed display unit on the basis of a detected value of the engine speed and the simulation speed during a predetermined time period after a gear shift control is terminated, and gradually increases a weighting to be applied to the detected value of the engine speed as time elapses.

15. The vehicle engine speed display device according to claim 7, wherein
the responsiveness changing unit terminates the advance correction of the simulation speed at an idealistic termination time at which the gear shift control by a theoretically shortest time period is terminated, and controls the engine speed display unit on the basis of a simulation speed which is not subjected to advance correction after the idealistic termination time.

16. The vehicle engine speed display device according to claim 15, wherein
the simulation speed is a value changed by a rate of change, the rate of change being determined on the basis of a theoretically shortest time period required for performing a gear shift operation, and a gear ratio after the gear shift operation is performed.

17. The vehicle engine speed display device according to claim 16, wherein
the responsiveness changing unit controls the engine speed display unit on the basis of a detected value of the engine speed and the simulation speed during a predetermined time period after a gear shift control is terminated, and gradually increases a weighting to be applied to the detected value of the engine speed as time elapses.

18. The vehicle engine speed display device according to claim 7, wherein
the simulation speed is a value changed by a rate of change, the rate of change being determined on the basis of a theoretically shortest time period required for performing a gear shift operation, and a gear ratio after the gear shift operation is performed.

19. The vehicle engine speed display device according to claim 18, wherein
the responsiveness changing unit controls the engine speed display unit on the basis of a detected value of the engine speed and the simulation speed during a predetermined time period after a gear shift control is terminated, and gradually increases a weighting to be applied to the detected value of the engine speed as time elapses.

20. The vehicle engine speed display device according to claim 8, wherein
the simulation speed is a value changed by a rate of change, the rate of change being determined on the basis of a theoretically shortest time period required for performing a gear shift operation, and a gear ratio after the gear shift operation is performed.

* * * * *